No. 734,108. PATENTED JULY 21, 1903.
C. O. TINGLEY.
PLUG FOR PNEUMATIC TIRES.
APPLICATION FILED APR. 29, 1903.
NO MODEL.
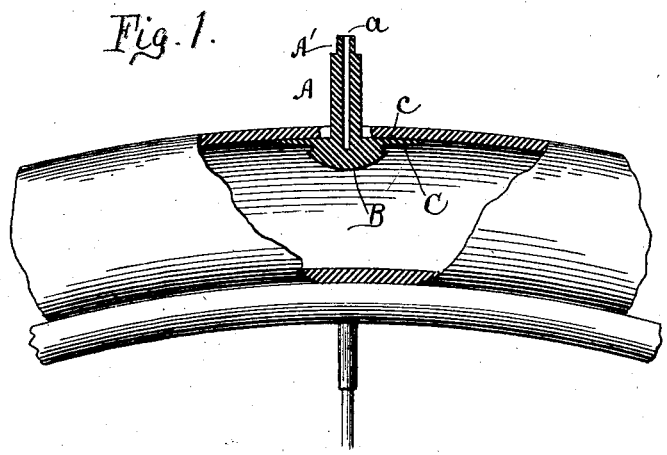
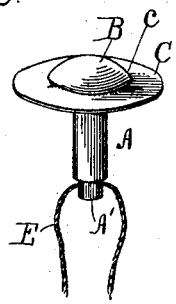
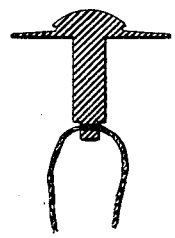
Witnesses
Theo. C. Steinhaus
M. F. Boyle
Inventor
Charles O. Tingley
By his Attorney
Thomas Drew Stetson No. 734,108.

Patented July 21, 1903.

UNITED STATES PATENT OFFICE.

CHARLES O. TINGLEY, OF RAHWAY, NEW JERSEY.

PLUG FOR PNEUMATIC TIRES.

SPECIFICATION forming part of Letters Patent No. 734,108, dated July 21, 1903.

Application filed April 29, 1903. Serial No. 154,761. (No model.)

*To all whom it may concern:*

Be it known that I, CHARLES OTIS TINGLEY, a citizen of the United States, residing at Rahway, in the county of Union and State of New Jersey, have invented a certain new and useful Improvement in Plugs for Pneumatic Tires, of which the following is a specification.

The improvement pertains to the much-approved class of plugs which are formed of rubber of about the same composition as the tire and introduced head inward into the properly-enlarged round hole which it is to stop and is drawn outward by the shank until the under face of its head is brought into close contact with the interior of the tire. After the cement with which the surfaces were previously well smeared has had time to properly set, the plug, which must originally be made with a shank of considerably greater length than the thickness of the tire, is cut off flush with the adjacent surface of the tire. I have discovered that an improved effect is produced by having a thin margin extend outward from the head, giving a greatly-enlarged surface to be cemented to the tire by the process described, and have devised a construction which greatly facilitates the insertion of a plug with such an extended head.

My improved plug has a head of considerable thickness at the center, gradually reduced outward to a certain extent, and then suddenly reduced to a thin lamina, which latter is extended out of nearly even thickness to the margin. The thick portion of the head projects to a considerable extent beyond the diameter of the shank, and consequently so that the thick portion of the head underlaps to about the ordinary extent. The thin extension beyond becoming more or less cemented to the body reinforces the edge of the head to resist the strong tendency to let go when the tire is strongly blown up and then subjected to further severe strain in working. The offset is preferably cut under a little, as will be more fully shown below. Its effect is to allow all of the thin portion of the head which extends out beyond such offset to be crumpled into insignificant proportions when the plug is forced into the hole.

The invention renders it practicable to force in a plug having a very large surface for cementing to the interior of the tire.

The invention involves no appreciable increase in the expense of manufacture, and the difficulties encountered in forcing in the plug are easily surmounted.

The following is a description of what I consider the best means of carrying out the invention.

Figure 1 is a central longitudinal section showing also a portion of the tire in which it is set. Fig. 2 is a perspective view of the same, and Fig. 3 is a central longitudinal section showing a modification.

Similar letters of reference indicate like parts in all the figures where they appear.

A is the shank, B the head, C a thin extension of the head, and $c$ the offset by which the thickness of the head is reduced at the junction of the parts B and C—that is to say, the head B is thick at the center and greatly reduced in thickness as it extends outward in all directions until a line is reached considerably beyond the radius of the shank A, and at this line it is reduced in thickness by a sudden offset, which is not only an abrupt diminution of the thickness of the head, but is also slightly undercut, so as to form a shallow circumferential groove, as shown in Figs. 1 and 3. In the axial line of the plug A is a hole $a$, which extends the whole length of the shank and a little into the head, as clearly shown in Fig. 1. Outside of the undercut offset $c$ the head extends with a greatly-reduced and nearly uniform thickness to the edge, where it terminates abruptly.

The end of the plug A opposite to the head is reduced in diameter, as indicated by A', and receives the bight of a piece of stout twine E, which is extended through a radial hole.

In applying the invention the shank A and the under surface of both portions B and C of the head are liberally coated with cement, and the hole in the tire and also the inner surface of the tire for a proper extent exterior to the hole is also smeared with the same. Then the plug is held upon a bodkin, the end of a straight piece of wire, or any suitable article which is of dimensions to enter the hole $a$ and is thrust forcibly into the hole in the tire until the plug is nearly or completely within the tire. Then, the cord E being properly pulled, the plug is drawn out until the under face of the head—both parts, the thick portion B and the thin extension C—lies fairly up in contact with the inner surface of the tire. My experiments indicate that it will become cemented thereto over the whole area. The bodkin is withdrawn, and in a short time the projecting end of the plug may be smoothly cut off, and the job is complete.

The invention obviates in a great degree the liability of plugs to be blown out under any possible circumstances.

Although I have in this description referred to the invention as applied to a tire, it is obvious that it may apply to the closing of apertures in straight hose or any other tubing of rubber or compounds thereof, the manipulation being the same as described. In all of them the thin extension sharply defined by the offset will, as in serving with a tire, assume very small dimensions and will itself expand when liberated into a plane condition and when forcibly drawn up will take the proper curved condition to apply fairly and be cemented against the interior surface of the tube.

Modifications may be made without departing from the principle or sacrificing the advantages of the invention. I can omit the hole $a$ and employ ordinary means of holding the plug by the shank in the act of forcing it in.

The undercut character of the offset $c$ is not absolutely necessary. The invention will succeed with the offset simply perpendicular.

I claim as my invention—

1. A plug having a shank A, swelled head B and thin extension C, all formed integral with an abrupt thinning in the form of a contraction or undercut condition $c$ at the junction of the latter parts, all substantially as herein specified.

2. A plug having a shank A, swelled head B, with a central hole $a$ therein, a thin extension C, all formed integral with an abrupt thinning in the form of a contraction or cut-under condition $c$ at the junction of the latter parts, all substantially as herein specified.

In testimony that I claim the invention above set forth I affix my signature in presence of two witnesses.

CHARLES O. TINGLEY.

Witnesses:
THOMAS DREW STETSON,
M. F. BOYLE.